(12) United States Patent
Farrar et al.

(10) Patent No.: US 10,106,187 B1
(45) Date of Patent: Oct. 23, 2018

(54) BABY CARRIER DEVICE

(71) Applicants: Mark Edward Farrar, Butte, MT (US); Dakota James Farrar, Butte, MT (US)

(72) Inventors: Mark Edward Farrar, Butte, MT (US); Dakota James Farrar, Butte, MT (US)

( * ) Notice: Subject to any disclaimer, the term of this patent is extended or adjusted under 35 U.S.C. 154(b) by 0 days.

(21) Appl. No.: 15/678,312

(22) Filed: Aug. 16, 2017

Related U.S. Application Data

(60) Provisional application No. 62/409,834, filed on Oct. 18, 2016, provisional application No. 62/376,654, filed on Aug. 18, 2016, provisional application No. 62/425,217, filed on Nov. 22, 2016.

(51) Int. Cl.
| | |
|---|---|
| *B62B 7/12* | (2006.01) |
| *A47D 11/00* | (2006.01) |
| *A47D 13/02* | (2006.01) |
| *B60N 2/28* | (2006.01) |

(52) U.S. Cl.
CPC ............ *B62B 7/123* (2013.01); *A47D 11/005* (2013.01); *A47D 13/025* (2013.01); *B60N 2/2848* (2013.01)

(58) Field of Classification Search
CPC B62B 3/007; B62B 5/08; B62B 5/082; B62B 5/085; B62B 7/00; B62B 7/002; B62B 7/004; B62B 7/006; B62B 7/08; B62B 7/086; B62B 7/123; A61G 5/08; A61G 2005/0841; A61G 7/06; A61G 7/062; A61G 7/064; A61G 7/066; A61G 7/068; A61G 7/08; A61G 7/083; A61G 7/086
See application file for complete search history.

(56) References Cited

U.S. PATENT DOCUMENTS

| | | | |
|---|---|---|---|
| 6,572,189 B1 | 6/2003 | Blaymore | |
| 6,986,518 B1 | 1/2006 | Besaw | |
| 7,037,205 B1 | 5/2006 | Bowman | |
| 2008/0224451 A1* | 9/2008 | Vegt | B62B 7/068 280/642 |
| 2013/0140797 A1* | 6/2013 | Fritz | B62B 7/08 280/649 |
| 2014/0097598 A1* | 4/2014 | Sundberg | B62B 7/12 280/650 |
| 2015/0307120 A1* | 10/2015 | Sundberg | B62B 7/062 280/642 |

* cited by examiner

*Primary Examiner* — John D Walters
*Assistant Examiner* — James J Triggs
(74) *Attorney, Agent, or Firm* — Eric Karich; Karich & Associates

(57) ABSTRACT

A baby carrier device has a main body operably mounted on pairs of front and rear leg assembles. The main body includes a middle body portion, a front body portion pivotally mounted on a front of the middle body portion with a pair of forward pivots, and a rear body portion that is pivotally mounted on a rear of the middle body portion via a pair of rear pivots. The pair of front leg assemblies are pivotally mounted on the forward pivots and extend to a wheel. The pair of rear leg assemblies are pivotally mounted on the rear pivots and extend to a wheel. A handle assembly is also pivotally mounted on the main body.

10 Claims, 8 Drawing Sheets

BABY CARRIER DEVICE

CROSS-REFERENCE TO RELATED APPLICATIONS

This application for a utility patent claims the benefit of the following U.S. Provisional Applications: Application No. 62/376,654, filed Aug. 18, 2016; Application No. 62/409,834, filed Oct. 18, 2016; and Application No. 62/425,217, filed Nov. 22, 2016.

BACKGROUND OF THE INVENTION

Field of the Invention

This invention relates generally to a baby carrier device, and more particularly to a baby carrier device that may be converted between multiple configurations, including a crib, a car seat, a changing table, a stroller, and a high chair.

Description of Related Art

The prior art teaches a wide range of child carrying devices, some of which convert into other child related devices. For example, Besaw, U.S. Pat. No. 6,986,518, teaches a baby car seat that converts to a stroller. The car seat includes a base that may be removably mounted in a vehicle, and the car seat may be mounted in the car via the base. The car seat includes a plurality of wheels so that the car seat may be rolled as a stroller. A telescopically extendable handle is provided for pushing or pulling the car seat when being used as a stroller.

The prior art teaches car seat that may be used as a wheeled stroller. However, the prior art does not teach a car seat that includes front and rear pivots that enable the car seat to convert to a range of baby devices, including a stroller, a raised crib, a lowered crib, a raised or lowered changing table, and other useful configurations and accessories. The present invention fulfills these needs and provides further advantages as described in the following summary.

SUMMARY OF THE INVENTION

The present invention teaches certain benefits in construction and use which give rise to the objectives described below.

The present invention provides a baby carrier device that includes a main body operably mounted on pairs of front and rear leg assemblies. The main body includes a middle body portion, a front body portion pivotally mounted on a front of the middle body portion with a pair of forward pivots, and a rear body portion that is pivotally mounted on a rear of the middle body portion via a pair of rear pivots. The pair of front leg assemblies are pivotally mounted on the forward pivots and extend to a wheel. The pair of rear leg assemblies are pivotally mounted on the rear pivots and extend to a wheel. A handle assembly is also pivotally mounted on the main body on one of the two main pivots.

A primary objective of the present invention is to provide a baby carrier device having advantages not taught by the prior art.

Another objective is to provide a baby carrier device that is convertible into a variety of configurations including but not limited to an infant car seat, a toddle car seat, a stroller, a crib, a changing table, and other useful configurations, thereby saving the user from purchasing and storing multiple baby-related items.

A further objective is to provide a baby carrier device that can be adapted to accommodate a baby as he or she grows from a toddler into a small child.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above-described drawing figures illustrate the invention, a baby carrier device 10 that may be converted between multiple configurations, including, but not limited to, a stroller with or without a weather shield deployed, a crib, a changing table, an infant car seat, a toddler car seat, and other useful configurations. The baby carrier device 10 is suitable for use with a baby of any age, from infant to child, so these terms are used interchangeably and should be considered equivalent for purposes of this application. By adjusting to different uses, and to the size of the infant/child, a parent is saved a great deal in cost in only purchasing the one device, and also in storage of a great number of baby accessories. Accessories include a swing and/or a jogging kit.

Figure 1:
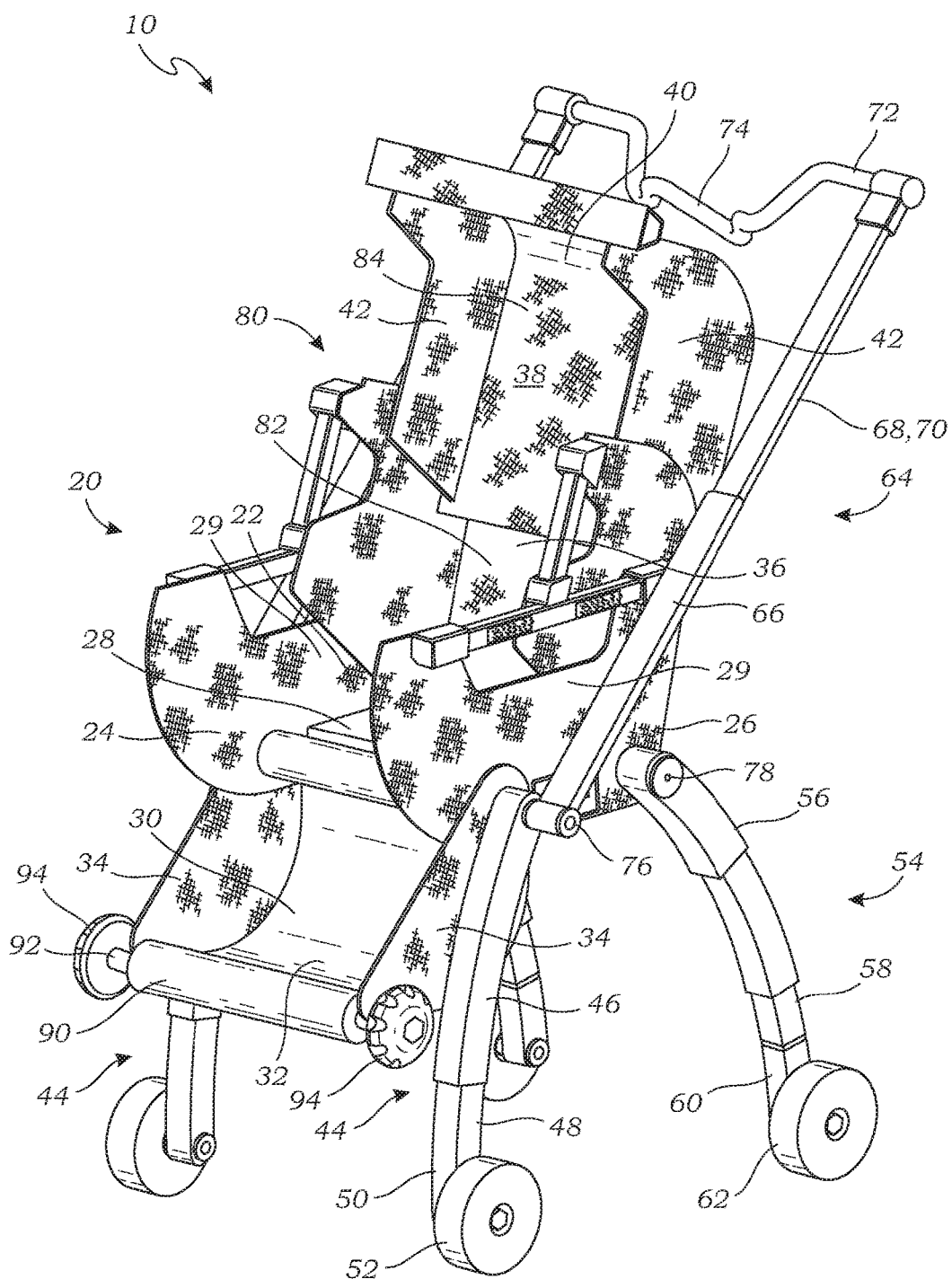
FIG. 1 is a perspective view of a baby carrier device according to one embodiment of the present invention, illustrating the baby carrier device in a stroller configuration set up for a toddler.
Figure 2:
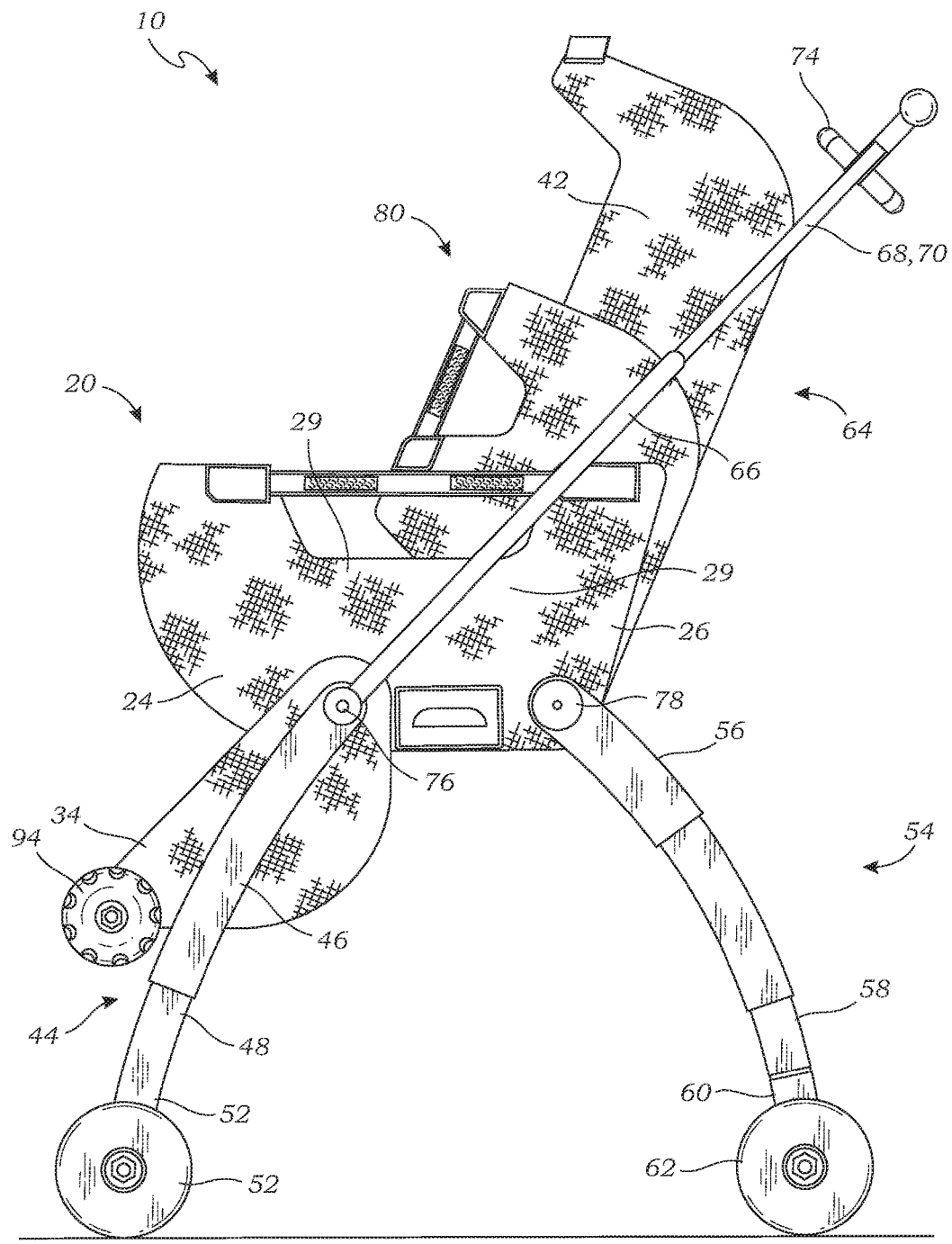
FIG. 2 is a side elevational view thereof.

FIG. 1 is a perspective view of one embodiment of the baby carrier device 10, illustrating the device in a stroller configuration. FIG. 2 is a side elevational view thereof. As shown in FIGS. 1 and 2, the baby carrier device 10 includes a main body 20 that is constructed of three separate components, a middle body portion 22 that forms the main structure of the device, and further includes a front body portion 30 pivotally mounted on a front 24 of the middle body portion 22, and a rear body portion 36 that is pivotally mounted on a rear 26 of the middle body portion 22.

As shown in FIGS. 1 and 2, the middle body portion 22 may include a generally planar upwardly facing structure 28 that is suitable for supporting a child (i.e., it is suitably soft and padded). The middle body portion 22 may further include upwardly extending side walls 29 that are disposed on generally parallel planes and laterally spaced for keeping the child between the walls 29, and within the baby carrier device 10.

As shown in FIGS. 1 and 2, the front body portion 30 may include a front wall 32 and front sidewalls 34, and the rear body portion 36 may include a support surface 38, a rear surface 40 that extends generally perpendicular to the support surface 38, and rear sidewalls 42 which connect the two to form a protective structure. The front body portion 30 pivots to different positions to convert the baby carrier device 10 into different baby-related accessories, as discussed in greater detail below. In the embodiment shown in FIGS. 1 and 2, the front body portion 30 is pivoted downwardly to allow the baby to sit on the middle body portion 22 with his or her legs hanging downwardly into the front body portion 30.

Similarly, the rear body portion 36 pivots to different positions to convert the baby carrier device 10 into different baby-related accessories, as discussed in greater detail below. In the embodiment shown in FIGS. 1 and 2, the rear body portion 36 is pivoted upwardly to provide a back rest to support the baby in a seated position, although other positions are also available if desired.

As shown in FIGS. 1 and 2, the baby carrier device 10 further includes a pair of front leg assemblies 44 and a pair of rear leg assemblies 54, for supporting the baby carrier device 10 above the ground. Each of the front leg assemblies 44 may include a top leg portion 46 and a bottom leg portion 48 which can slide to (e.g., telescopically) engage each other so that the length of the assembly may be varied. The top leg portion 46 and the bottom leg portion 48 together may include a locking mechanism (not shown) (e.g., pin, or other locking mechanism known in the art) for locking the top leg portion 46 with respect to the bottom leg portion 48, for locking the leg assembly in one of multiple predetermined lengths.

Similarly, each of the rear leg assemblies 54 may include a top leg portion 56 and a bottom leg portion 58 which can slide to (e.g., telescopically) engage each other so that the length of the assembly may be varied. The top leg portion 56 and the bottom leg portion 58 together may include a locking mechanism (not shown) (e.g., pin, or other locking mechanism known in the art) for locking the top leg portion 56 with respect to the bottom leg portion 58, for locking the leg assembly in one of multiple predetermined lengths. Additional segments may also be included if desired. In alternative embodiments, the legs may also be formed as a single unit, although this would limit the adjustability of the device 10.

A wheel 52 is rotationally mounted at a bottom end 50 of the bottom leg portion 48 of each of the front leg assemblies 44. Similarly, a wheel 62 is rotationally mounted at a bottom end 60 of the bottom leg portion 58 of each of the rear leg assemblies 54. The wheels 52 and 62 on the front and/or rear leg assemblies 44 and 54 may also be pivotally mounted to enable steering of the baby carrier device 10; although alternatively they may be fixedly mounted without pivoting.

In one embodiment, the front leg assemblies 44 have a concave curvature to the top leg portions 46 and bottom leg portions 48, and the rear leg assemblies 54 have a convex curvature to the top leg portions 56 and bottom leg portions 58 (when viewed from the front), so that the front and rear leg assemblies 44 and 54 can be folded up to and against the main body 20, as discussed in greater detail below, and as shown in subsequent figures.

In one embodiment, the baby carrier device 10 further includes a handle assembly 64 that includes a pair of lower struts 66 that are each pivotally mounted on the main body 20. An upper handle portion 68 has a generally U-shaped body with a pair of elongate handle portions 70 connected by a crossbar 72. The crossbar 72 may include a Z-curved gripping handle 74 which is shaped for easier gripping of the upper handle portion 68 by the parent when carrying the device. Each of the elongate handle portions 70 may be adapted to slidably engage (e.g., telescopically, or otherwise) one of the lower struts 66, so that the overall length of the handle assembly 64 may be varied. As with the leg assemblies 44 and 54, the handle assembly 64 may include a locking mechanism (not shown) (e.g., pin, or other locking mechanism known in the art) for locking the upper handle portion 68 with respect to the lower struts 66, for locking the handle assembly 64 in one of multiple predetermined lengths.

As shown in FIGS. 1 and 2, in this embodiment, a pair of forward pivots 76 are formed on the front 24 of the middle body portion 22 of the main body 20, and the front body portion 30 and the front leg assemblies 44 pivot on these forward pivots 76, all about the same axis of rotation.

Similarly a pair of rear pivots 78 are formed on the rear 26 of the middle body portion 22 of the main body 20, and the rear body portion 36 and the rear leg assemblies 54 all pivot on these forward pivots 76, all about the same axis of rotation.

In the present embodiment, the handle assembly 64 also is mounted on the forward pivots 76, and also pivots about this same axis of rotation. In an alternative embodiment, the handle assembly 64 may be pivotally mounted on the rear pivots 78.

Figure 3:
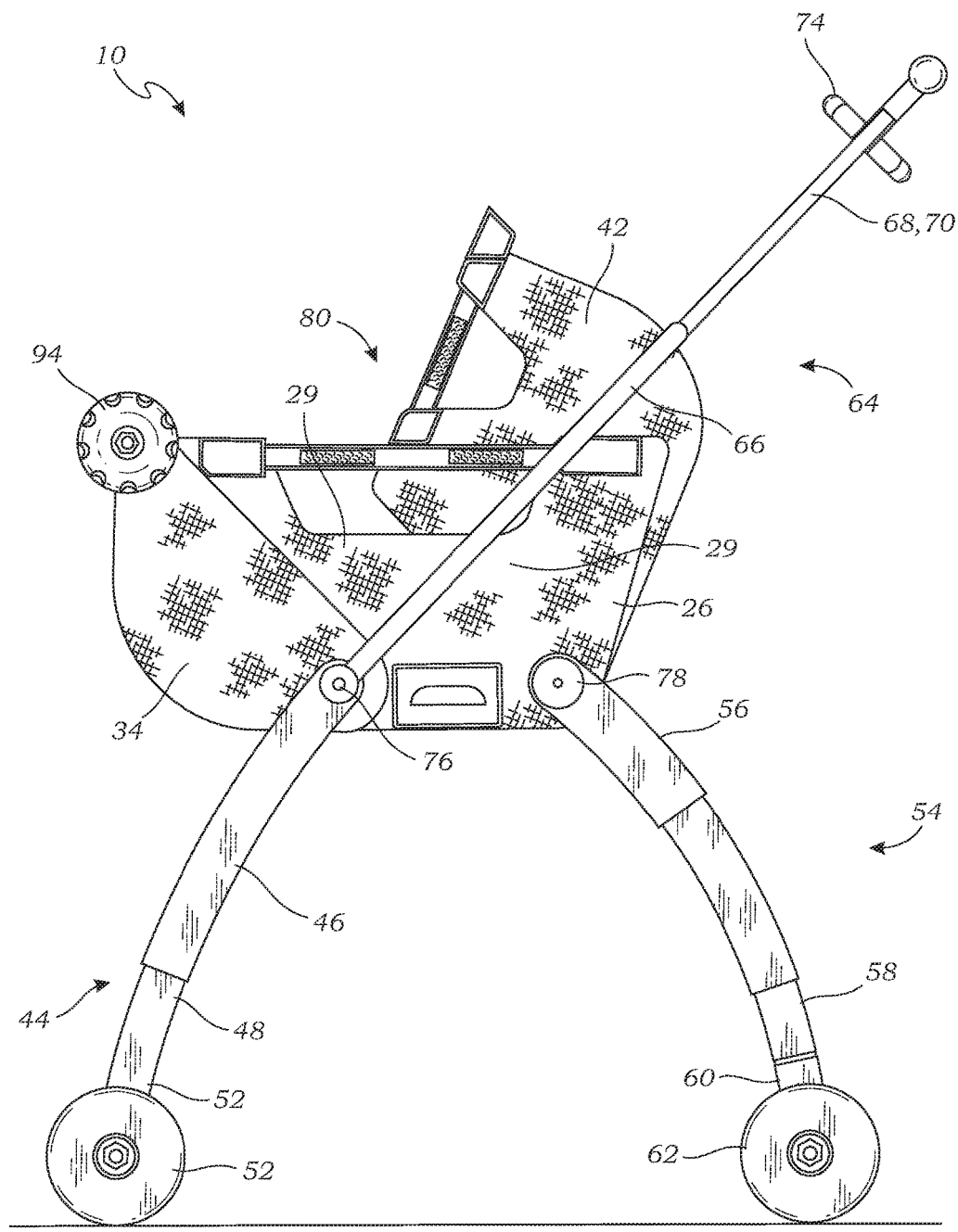
FIG. 3 is a side elevational view of a rear body portion telescopically adjusted to a lowered infant position.

FIG. 3 is a side elevational view of a rear body portion 36 telescopically adjusted to a lowered position. As shown in FIG. 3, the rear body portion 36 may be in the form of an extendable rear body portion 80 constructed in two parts, a lower part 82 that is attached to the main body 20 of the baby carrier device 10, and an upper part 84 that can slide to extend the length of the rear body portion 36 as a child grows. When desired, the upper part 84 may be lifted upwardly, as illustrated in FIGS. 1-2, so that the total length of the rear body portion 36 is increased. When no longer required, it may be collapsed back to the smaller height, as shown in FIG. 3.

In one embodiment, the rear body portion 36 further includes one or more speakers (not shown) which are operably mounted so that the child may listen to audible media (e.g., music, a soundtrack of a movie, etc.) without harming the hearing of the child, or causing undue noise to nearby adults. In one embodiment, the speakers may be mounted in or around the rear sidewalls 42; however, the particular locations of the speakers may vary according to the needs of the users.

Figure 4:
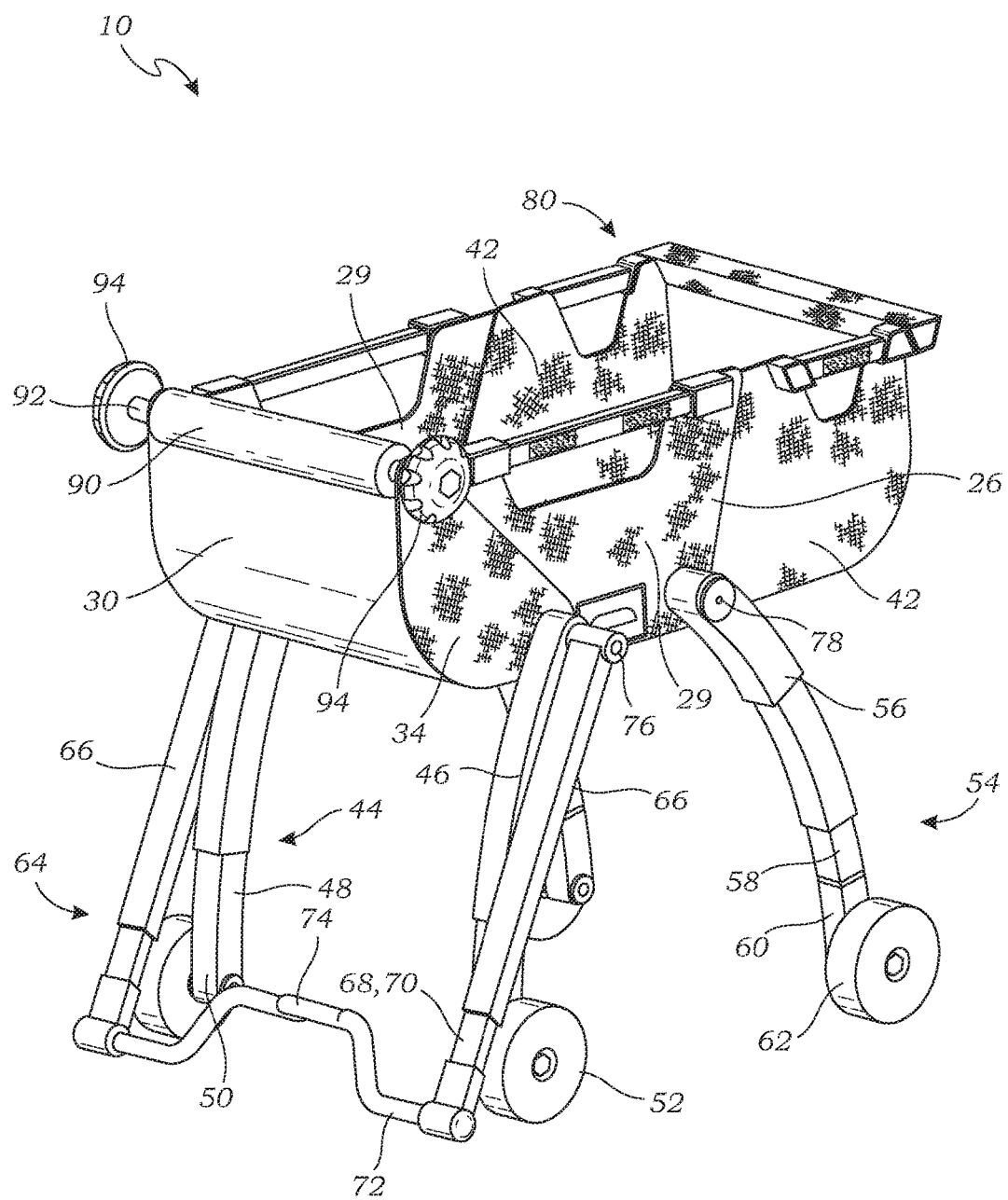
FIG. 4 is a perspective view of the baby carrier device in a crib configuration.

FIG. 4 is a perspective view of the baby carrier device 10 in a crib configuration. As shown in FIG. 4, in the crib configuration the legs are folded up against the main body 20 so that the front and rear leg assemblies 44 and 54 and/or wheels 52 and 62 about the main body 20, or are within close proximity thereto. The crib may be used either at ground level or a raised level. In some embodiments, the wheels 52 and 62 may nest into receiving compartments (not shown) formed in the underside or side of the main body 20. The handle assembly 64 may similarly telescope down to a size and position such that it remains in close proximity to the main body 20.

Figure 5:
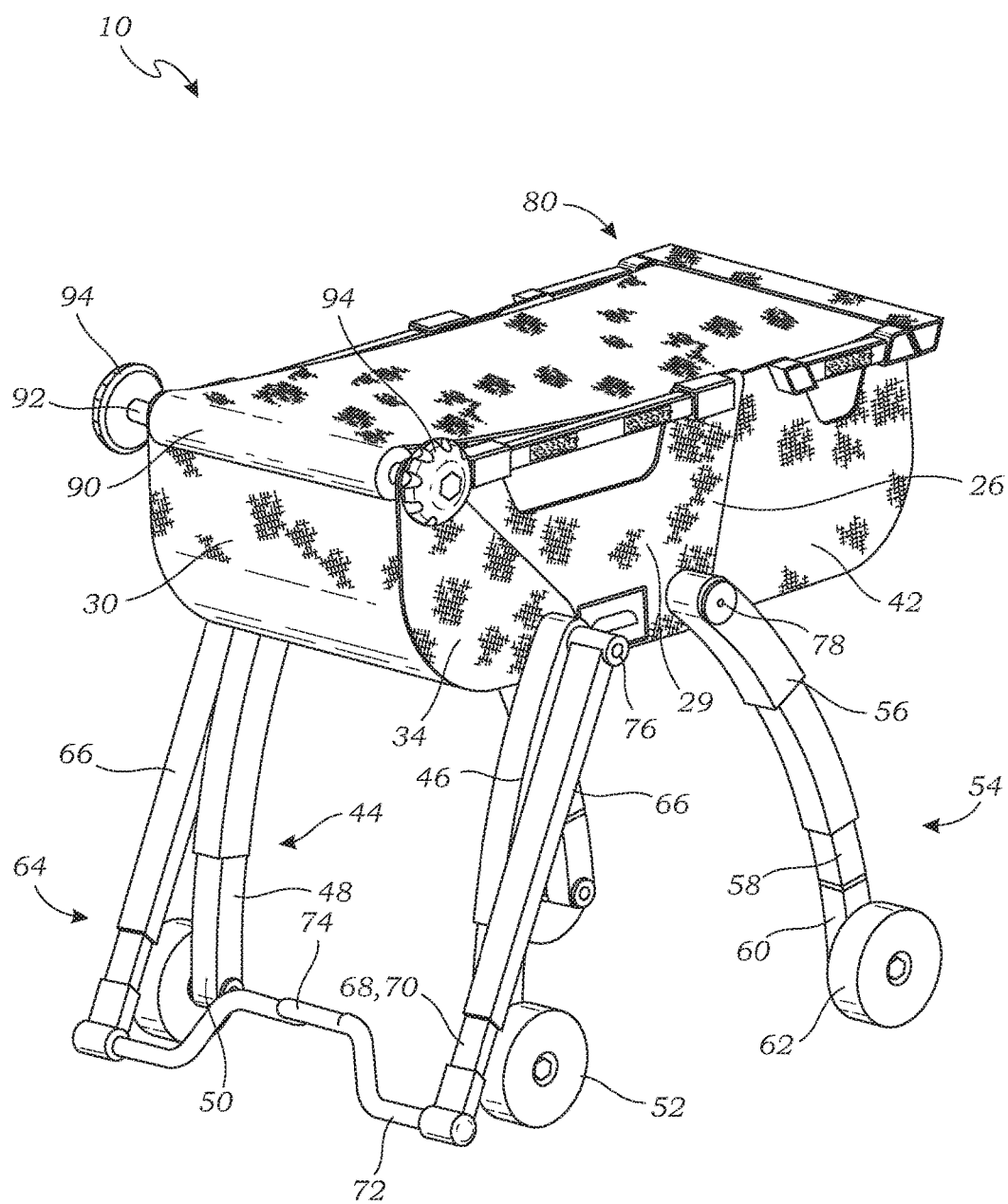
FIG. 5 is a perspective view of the baby carrier device in a changing table configuration.
Figure 6:
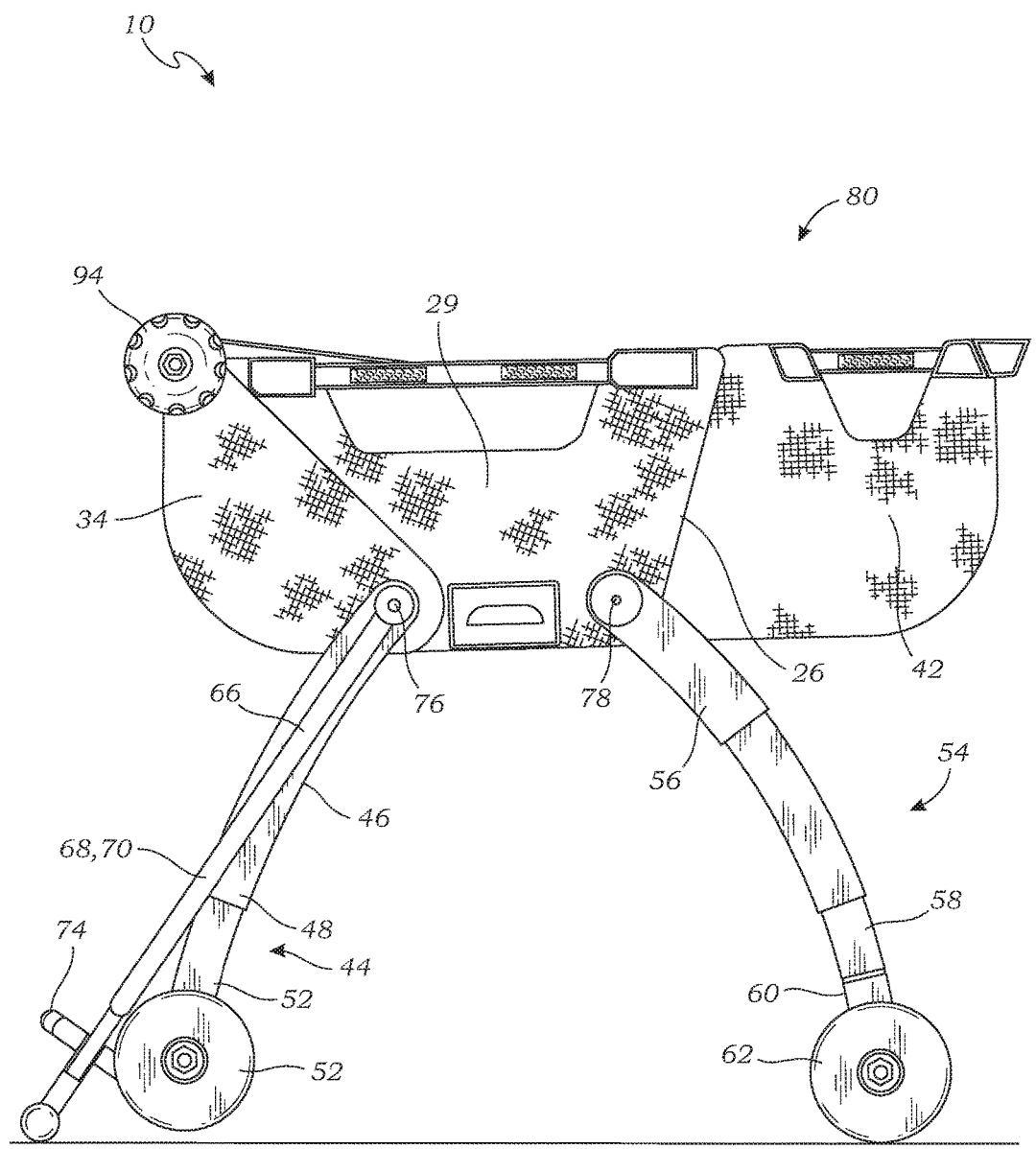
FIG. 6 is a side elevational view thereof.

FIG. 5 is a perspective view of the baby carrier device 10 in a changing table configuration and like the crib configuration, may be used either at ground or raised level. FIG. 6 is a side elevational view thereof. As shown in FIGS. 5-6, the baby carrier device 10 includes a changing table cover sheet 90 that is stored on a roller 92. The changing table cover sheet 90 is constructed of a suitable material (e.g., Vinyl, cloth, etc.) so that it may cover the main body 20 of the baby carrier device 10 for providing a changing table. The changing table cover sheet 90 may include fasteners 94 (e.g., hooks and loops fasteners 94, snaps, etc.) for fastening the cover sheet 90 in place and doubles as a weather shield in stroller configuration. In this embodiment, the cover sheet 90 includes extended edges 96 having hooks and loops fasteners 94 (i.e., Velcro®) for fastening the edges to the sides 98 of the main body 20. Following use, the cover sheet 90 may be retracted into the roller 92.

While not illustrated, the wheels 52 and 62 may also be pivotally mounted on the legs, so that they may be pivoted 180 degrees to move from the inside (under the baby carrier device 10) to the outside (extending out from the baby carrier device 10), to provide greater stability when so desired, such as when using the baby carrier device 10 as a changing table. A locking mechanism (e.g., pin, etc.) may be used to lock the wheels 52 and/or 62 in a given orientation, if desired. The handle 68, 70 rotates such that two wheels are slightly off the ground for greater stability and to hold fast the changing table when in use.

Figure 7:
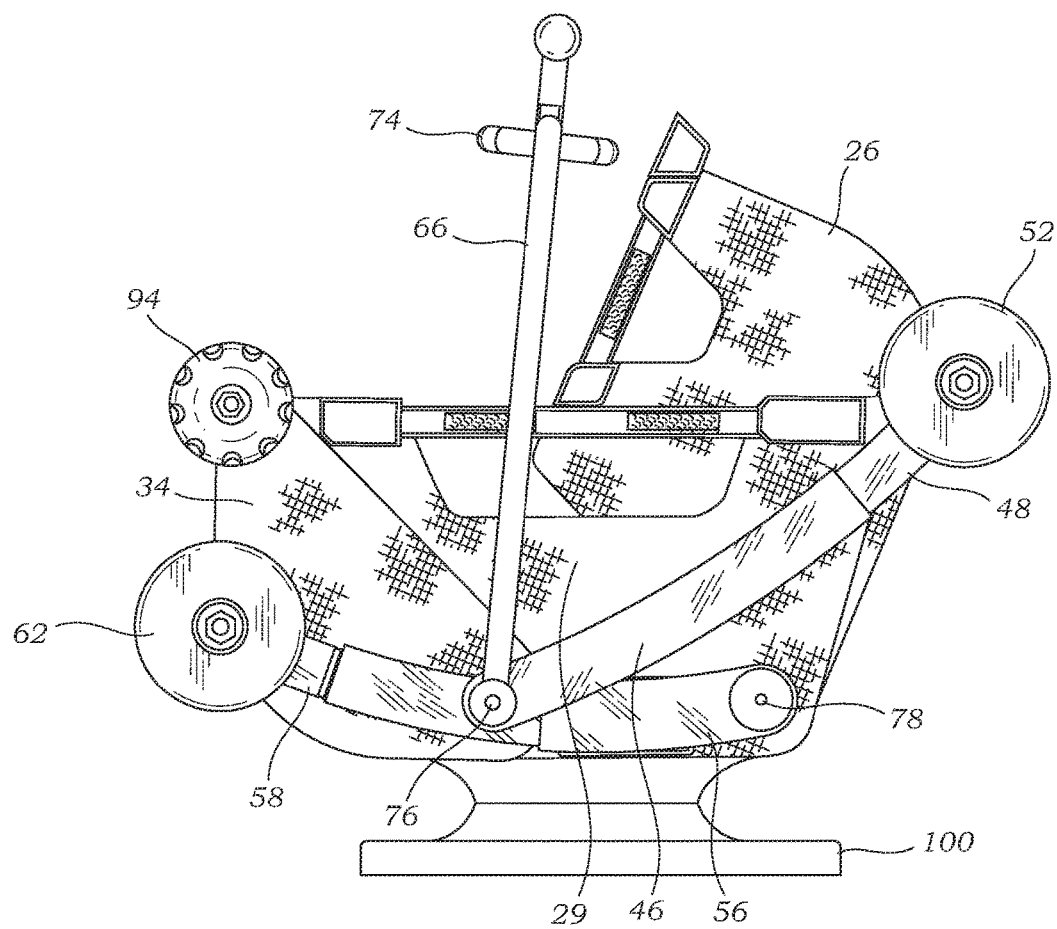
FIG. 7 is a side elevational view of the baby carrier device in an infant car seat configuration and mounted on a base unit.

FIG. 7 is a side elevational view of the baby carrier device 10 in an infant car seat configuration and mounted on a base unit 100. As shown in FIG. 7, the main body 20 may fit into and engage the base unit 100, which securely holds the baby carrier device 10 in a rear or forward facing configuration. A locking mechanism (not shown) may be included to lock the device 10 on the base unit 100, and the base unit 100 may further pivot to enable a parent to more easily remove the baby from the device 10. In this configuration, the rear body portion 36 is pivoted upwardly to a position for supporting the baby in a more upwardly seated position, and the front body portion 30 is pivoted to a horizontal position for supporting an infant.

Figure 8:
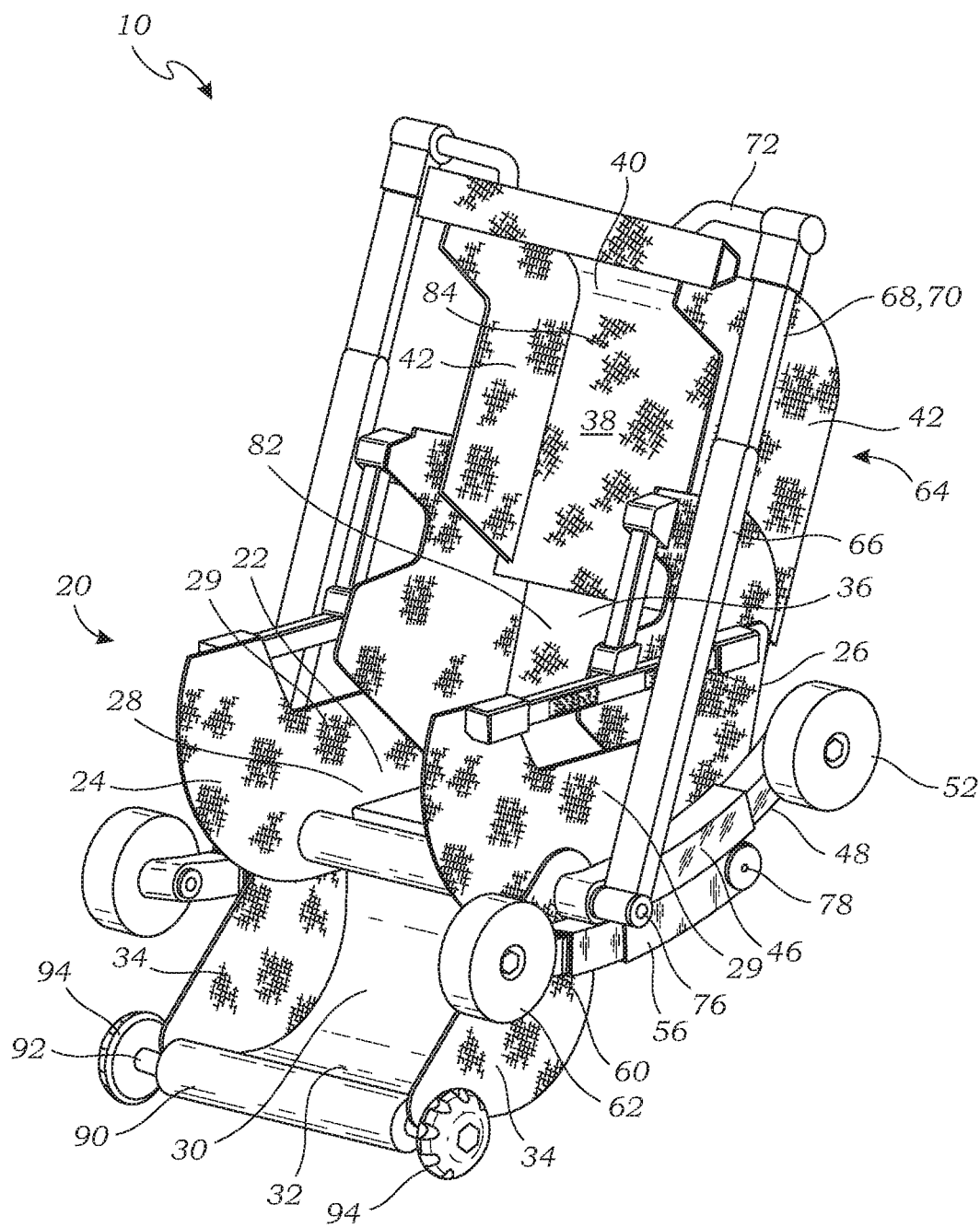
FIG. 8 is a perspective view of the baby carrier device in a toddler car seat configuration.

FIG. 8 is a perspective view of the baby carrier device 10 in a toddler car seat configuration. As shown in FIG. 8, the baby carrier device 10 grows with the child from infant through toddler (roughly 4 lbs. to 120 lbs.). The baby carrier device 10 may be adjusted to accommodate a small child in a forward facing position once the device is mounted in a vehicle (using a mounting system known in the art). This configuration is similar to the stroller 92 configuration of FIG. 1, only with the front and rear wheels 52 and 62 assemblies stowed, as shown. The device 10 may be mounted to a vehicle (not shown) via seatbelts, a base (not shown), or any other mechanism known in the art.

In alternative embodiments, the baby carrier device 10 may be configured as a high chair (w/or w/o attachable eating tray). A storage (e.g., drawer) 101 may be provided under the seating area that allows for the storage of items such as wipes, diapers and cream. Cup holders which are removable for easy cleaning may be included and may be interchangeable with soft toys (not shown) that are designed such they would not create an additional hazard in the event of an accident. Battery powered LEDs (not shown) may be fitted to the inside of the hood for entertainment. Two of the devices 10 may be hooked together for the transport of two children. An accessory that can be sold separately or with the device is an A/C powered swing stand that mounts to the same two (2) pivot points all of the device transforms around. The swing is collapsible for easy storage. An optional accessory (not shown) includes a set of attachable tricycle wheels to configure the stroller as a jogging stroller. These may be interchangeable between front or rear and could allow either forward or rear facing configurations. The brake system may be designed such that it applies variable friction while jogging or locked when stopped. These optional wheels are much larger than the stroller wheels and may be fitted to the interior metal axel of each of the 4 stroller wheels. The device may contain a system that can be controlled via Bluetooth® that can uses both seat and backrest indicators if a child is left in the car and the parent walks too far away with their cellular phone. Intention would be that the phone would ring the parent immediately that they were out of range of the vehicle to alert them of the possibility they left their child in the car. Without appropriate action in a desired timeline, the system would alert authorities and using GPS, locate the vehicle with license plate number and description. Should that parent leave their phone behind as well, the system may also be activated if the doors are locked and weight is still sensed, directly alerting the phone and authorities for redundancy. Aside from potentially saving lives, this system will also let authorities know that the parent had this system installed should they be alerted and help provide intent that the parent had made a mistake, knowing this system would alert an emergency response. This system could also combine with an alarm or a voice alert that there is a child in the car to potential passerby's as so many typical car alarms are ignored.

The baby carrier device 10 enables the parent(s) to purchase the above devices in one neat package (with the exclusion of the swing, a separate, yet collapsible component. This saves a great deal of expense as well as room saved by having an all-in-one device. The overall cost of buying each device independently and the ability to choose to use the changing table when in a public place over the wall mounted public changing tables or when none is available at all. As well this opens up a lot of room in the buyer's home that would be otherwise filled with many items for a child's care.

In some embodiments, the main body 20, and many of the components would typically be made of molded plastic, although other materials known in the art may alternative be used. Similarly, tires, drawers, and other removable or protective items may also be constructed of molded plastic or other suitable materials known in the art. Other items include a comfort grip for the handle bar and anti-roll covers at each corner of the same bar for when placed in the downward position. Rubber, vinyl or other materials may be suited for some of the mentioned components at the manufacturer's option. Expanded polyurethane foam or other suitable equivalent may be used for a liner, metal bars or rods on which to mount the wheels 52 and 62, latch points, springs and ball pin or bullet like stubs to create stop points for some items or mechanisms. A foam cushioned pad may be included for comfort as well as providing a means by which to adjust the width from infant to toddler size covered with comfortable and durable cloth that can be removed and hopefully be machine washable. Industry standard material for seat belt and tie down mechanism. Extendable, retractable wheel armatures may be included and should be a sturdy, yet semi-flexible plastic to keep overall weight down for ease of removal from the car seat carrier that is semi-permanently installed in the vehicle. While some suitable materials and constructions are described herein, the invention is not limited thereto, but these are merely provided as exemplary options, and any materials and constructions known in the art should be considered within the scope of the present invention.

As used in this application, the words "a," "an," and "one" are defined to include one or more of the referenced item unless specifically stated otherwise. The terms "approximately" and "about" are defined to mean +/−10%, unless otherwise stated. Also, the terms "have," "include," "contain," and similar terms are defined to mean "comprising" unless specifically stated otherwise.

Furthermore, the terminology used in the specification provided above is hereby defined to include similar and/or equivalent terms, and/or alternative embodiments that would be considered obvious to one skilled in the art given the teachings of the present patent application. While the invention has been described with reference to at least one particular embodiment, it is to be clearly understood that the invention is not limited to these embodiments, but rather the scope of the invention is defined only by actual claims.

What is claimed is:

1. A baby carrier device comprising:
   a main body comprising a middle body portion, a front body portion pivotally mounted on a front of the middle body portion with a pair of forward pivots, and a rear body portion that is pivotally mounted on a rear of the middle body portion via a pair of rear pivots;
   a pair of front leg assemblies pivotally mounted on the forward pivots, wherein each of the front leg assemblies includes a wheel;
   a pair of rear leg assemblies pivotally mounted on the rear pivots, wherein each of the rear leg assemblies includes a wheel;
   a handle assembly pivotally mounted on the main body.

2. The baby carrier device of claim 1, wherein the handle assembly also is mounted on the forward or rear pivots, and pivots about this same axis of rotation as the front or rear body portion and the front leg assemblies.

3. The baby carrier device of claim 1, wherein the middle body portion includes a generally planar upwardly facing surface, and upwardly extending side walls; wherein the front body portion includes a front wall and front sidewalls; and wherein the rear body portion includes a support surface, a rear surface that extends upwardly from the rear surface, and front sidewalls that connect the support surfaces and the rear surface.

4. The baby carrier device of claim 1, wherein the wheels are pivotally mounted on the front or rear leg assemblies to enable steering of the baby carrier device.

5. The baby carrier device of claim 1, wherein the front and rear leg assemblies each have a concave curvature.

6. A baby carrier device comprising:
   a main body comprising a middle body portion, a front body portion pivotally mounted on a front of the middle body portion with a pair of forward pivots, and a rear body portion that is pivotally mounted on a rear of the middle body portion via a pair of rear pivots;
   a pair of front leg assemblies pivotally mounted on the forward pivots, which each include a top leg portion and a bottom leg portion which adjustably engage each other so that the length of the front leg assemblies are variable, a wheel being rotatably mounted at a bottom end of the bottom leg portion of each of the front leg assemblies;
   a pair of rear leg assemblies pivotally mounted on the rear pivots, which each include a top leg portion and a bottom leg portion which adjustably engage each other so that the length of the rear leg assemblies are variable, a wheel being rotatably mounted at a bottom end of the bottom leg portion of each of the rear leg assemblies;
   a handle assembly that includes a pair of lower struts that are each pivotally mounted on the main body, and an upper handle portion, each of the elongate handle portions slidably engaging one of the lower struts, so that the handle assembly is extensible.

7. The baby carrier device of claim 6, wherein the handle assembly also is mounted on the forward pivots, and pivots about this same axis of rotation as the front body portion and the front leg assemblies.

8. The baby carrier device of claim 6, wherein the middle body portion includes a generally planar upwardly facing surface, and upwardly extending side walls; wherein the front body portion includes a front wall and front sidewalls, and wherein the rear body portion includes a support surface, a rear surface that extends upwardly from the rear surface, and front sidewalls that connect the support surfaces and the rear surface.

9. The baby carrier device of claim 6, wherein the wheels are pivotally mounted on the front or rear leg assemblies to enable steering of the baby carrier device.

10. The baby carrier device of claim 6, wherein the front and rear leg assemblies each have a concave curvature.

* * * * *